(12) United States Patent
Aridome et al.

(10) Patent No.: US 7,835,621 B2
(45) Date of Patent: Nov. 16, 2010

(54) ENCODING CONTROLLING APPARATUS AND ENCODING SYSTEM

(75) Inventors: Kenichiro Aridome, Kanagawa (JP); Hironobu Miyazaki, Tokyo (JP); Yukio Isobe, Kanagawa (JP)

(73) Assignee: Sony Corporation, Tokyo (JP)

( * ) Notice: Subject to any disclaimer, the term of this patent is extended or adjusted under 35 U.S.C. 154(b) by 1611 days.

(21) Appl. No.: 10/531,950

(22) PCT Filed: Oct. 29, 2004

(86) PCT No.: PCT/JP2004/016479

§ 371 (c)(1),
(2), (4) Date: Apr. 19, 2005

(87) PCT Pub. No.: WO2005/041583

PCT Pub. Date: May 6, 2005

(65) Prior Publication Data

US 2006/0051066 A1    Mar. 9, 2006

(30) Foreign Application Priority Data

Oct. 29, 2003    (JP)    .............................. 2003-369389

(51) Int. Cl.
    *H04N 5/91*    (2006.01)
(52) U.S. Cl. .............................. 386/92; 386/46; 386/59; 386/65; 386/111; 386/112; 386/40; 386/125
(58) Field of Classification Search .................. 386/59, 386/65, 124, 125, 92, 40, 111–112; 360/13
    See application file for complete search history.

(56) References Cited

U.S. PATENT DOCUMENTS 5,854,873 A * 12/1998 Mori et al. ..................... 386/92

(Continued)

FOREIGN PATENT DOCUMENTS

EP    1 085 513 A2    3/2001

(Continued)

OTHER PUBLICATIONS

Australian Patent Office Search Report, Dated Dec. 5, 2005.

(Continued)

*Primary Examiner*—Jamie J Atala
(74) *Attorney, Agent, or Firm*—Rader, Fishman & Grauer PLLC

(57) ABSTRACT

An encoding controlling apparatus is disclosed which includes: offset holding means for holding an offset equivalent to a time period by which to start encoding an audio signal earlier than a video signal upon recording of a chapter; recording mode determining means for determining whether a seamless connection is possible between the preceding chapter and the following chapter in order to set an initial value of the offset depending on an outcome of the determination; offset updating means for updating the offset in keeping with progress in encoding the video signal and the audio signal; and recording controlling means for giving an instruction either to start or to stop the encoding of the video signal and the audio signal in accordance with the offset. The inventive apparatus controls the encoding process in keeping with the offset between the audio and video signals, thereby achieving seamless connection between chapters without incurring discrepancies between the video and audio signals.

10 Claims, 10 Drawing Sheets

U.S. PATENT DOCUMENTS

| | | | |
|---|---|---|---|
| 6,388,968 B1 * | 5/2002 | Ohta et al. | 369/53.45 |
| 6,782,193 B1 * | 8/2004 | Nakatani et al. | 386/126 |
| 6,952,521 B2 * | 10/2005 | Kelly et al. | 386/52 |
| 7,200,836 B2 * | 4/2007 | Brodersen et al. | 717/100 |
| 2003/0021298 A1 | 1/2003 | Murakami et al. | |

FOREIGN PATENT DOCUMENTS

| | | |
|---|---|---|
| JP | 11-110915 | 4/1999 |
| JP | 2001-160945 | 6/2001 |
| JP | 2001-352521 | 12/2001 |
| WO | WO 97/13361 | 4/1997 |

OTHER PUBLICATIONS

Australian Patent Office Written Opinion, Dated Dec. 5, 2005.
International Search Report mailed Dec. 14, 2004.
International Search Opinion mailed Dec. 14, 2004.
PCT-Notification of Transmittal of Translation of the International Preliminary Report of Patentability, International Application No. PCT/JP2004/016479; International Filing Date: Oct. 29, 2004.
Supplementary EPO Search Report mailed Nov. 4, 2005.

* cited by examiner

ENCODING CONTROLLING APPARATUS AND ENCODING SYSTEM

TECHNICAL FIELD

The present invention relates to an encoding controlling apparatus and an encoding system. More particularly, the invention relates to an encoding controlling apparatus and an encoding system for synchronizing video and audio signals while controlling data encoding, to a processing method for use with the inventive apparatus and system, and to a program for causing a computer to carry out the inventive method.

BACKGROUND ART

Attention has been given in recent years to optical disks as recording media capable of recording video and audio data. Optical disks have gained widespread use not only as media that carry contents such as movies but also as recordable media to which users can record desired data. Among the well-known recordable media are DVD-R on which data can be written once per unit area, and DVD-RW to which data can be written repeatedly. While the DVD-Video standard has been known to provide an optical media file format applicable to read-only optical disks, it is also possible to write data to recordable optical media in compliance with this standard.

The DVD-Video standard allows a single recordable disk to accommodate up to 99 titles, each title containing up to 99 chapters (PTT: part of title). When a camcorder (camera and recorder) is used to record data to DVD-R or DVD-RW, a recorded unit ranging from beginning to end of one recording session is recorded as a chapter. Chapters are recorded under a single title that is completed when a specific condition is met, such as when the disk is ejected, when 99 chapters have been recorded or 99 cells have been accumulated within the title, or when the camcorder is switched from moving picture recording mode to still picture recording mode.

When the data recorded in units of chapters is reproduced, there occurs a short but noticeable break after each chapter, i.e., a blank display appears momentarily on the screen. Since each recorded unit generally lasts merely tens to dozens of seconds with the camcorder, getting the ongoing reproduction interrupted at such a frequency is awkward and undesirable.

A seamless connection technique has already been proposed by which to keep video streams connected in an apparently seamless manner during their reproduction (e.g., refer to Japanese Published Unexamined Patent Application No. 2001-352521, FIG. 2).

The conventional technique above involves absorbing discrepancies between video and audio data by supplying additional audio data portions in order to complement the video data when the two kinds of data are multiplexed. For example, according to the NTSC (National Television System Committee) standard, the frame frequency of video data is about 29.97 Hz. If it is assumed that one VOBU (video object unit) equals one GOP (group of pictures) which in turn is equal to 15 frames, then a period of 64 VOBUs is equivalent to 1/29.97×15×64=32.032032 (seconds). Because AC-3 (Audio Code Number 3; Dolby Digital) audio data is processed in increments of 32 milliseconds as AAU (audio access unit), the above-cited technique proposes adding one AAU to every 64 VOBUs and one AAU to every 64,000 VOBUs in order to resolve discrepancies between video and audio data.

However, the conventional technique above fails to fully eliminate the divergences between video and audio data; they tend to accumulate. Furthermore, what the proposed technique offers is merely an attempt to equalize video data temporally with corresponding audio data on an averaging basis. There is still a possibility that discrepancies can occur at points of supposedly seamless connection.

DISCLOSURE OF INVENTION

The present invention has been made in view of the above circumstances and provides, among others, a video encoding apparatus for seamlessly connecting chapters without incurring divergences between video and audio data.

In carrying out the invention and according to one aspect thereof, there is provided, as claimed in claim 1, an encoding controlling apparatus including: offset holding means for holding an offset equivalent to a time period by which to start encoding an audio signal earlier than a video signal upon recording of a chapter; recording mode determining means for determining whether a seamless connection is possible between the preceding chapter and the following chapter in order to set an initial value of the offset depending on an outcome of the determination; offset updating means for updating the offset in keeping with progress in encoding the video signal and the audio signal; and recording controlling means for giving an instruction either to start or to stop the encoding of the video signal and the audio signal in accordance with the offset. The encoding controlling apparatus of the above structure controls the encoding process in keeping with the offset between the video and the audio signals, thus achieving the seamless connection between chapters.

In one preferred structure of the inventive encoding controlling apparatus as claimed in claim 2, upon start of the recording, the recording controlling means may start encoding the audio signal earlier than the video signal by the time period equivalent to the offset; and upon end of the recording, the recording controlling means may stop the encoding after ending the encoding of each of record units constituting the video signal and the audio signal. This preferred structure of the invention allows the above-defined offset to compensate for a discrepancy that may occur between the video and the audio signals upon start of the encoding of the following chapter to be connected seamlessly to the preceding chapter.

In another preferred structure of the inventive encoding controlling apparatus as claimed in claim 3, if the seamless connection is found possible, then the recording mode determining means may regard as the initial value of the offset the value of the offset updated in the preceding chapter; and if the seamless connection is found impossible, then the recording mode determining means may regard zero as the initial value of the offset. This preferred structure of the invention ensures continuation of the offset derived from the encoding of the preceding chapter upon start of the encoding of the following chapter to be connected seamlessly.

In a further preferred structure according to the invention, the encoding controlling apparatus as claimed in claim 4 may further include fading controlling means for controlling a volume of the audio signal in accordance with an instruction either to start or to stop the audio signal. This preferred structure of the invention provides control over the volume of the audio signal at points of seamless connection.

In an even further preferred structure of the inventive encoding controlling apparatus as claimed in claim 5, the fading controlling means may control the volume of the audio signal so as to fade in the audio signal starting from a mute state upon start of the recording, and to fade out the audio signal upon end of the recording. This preferred structure of the invention averts generation of noises at points of seamless connection.

According to another aspect of the invention, there is provided, as claimed in claim 6, an encoding system including: video encoding means for encoding a video signal; audio encoding means for encoding an audio signal; offset holding means for holding an offset equivalent to a time period by which to start encoding the audio signal earlier than the video signal upon recording of a chapter; recording mode determining means for determining whether a seamless connection is possible between the preceding chapter and the following chapter in order to set an initial value of the offset depending on an outcome of the determination; offset updating means for updating the offset in keeping with progress in the encoding of the video signal and the audio signal performed by the video encoding means and the audio encoding means respectively; recording controlling means for giving an instruction either to start or to stop the encoding of the video signal and the audio signal in accordance with the offset; and multiplexing means for multiplexing the encoded video signal and the encoded audio signal output by the video encoding means and the audio encoding means respectively. The encoding system of the above structure controls the encoding process in keeping with the offset between the video and the audio signals, thereby ensuring the seamless connection between chapters without incurring discrepancies between the video and the audio signals.

According to a further aspect of the invention, there is provided, as claimed in claim 7, an encoding controlling method for use with an encoding controlling apparatus having offset holding means for holding an offset equivalent to a time period by which to start encoding an audio signal earlier than a video signal upon recording of a chapter, the encoding controlling method including the steps of: determining whether a seamless connection is possible between the preceding chapter and the following chapter; if the seamless connection is found possible, then regarding as an initial value of the offset the value of the offset updated in the chapter; if the seamless connection is found impossible, then regarding zero as the initial value of the offset; starting to encode the audio signal; starting to encode the video signal upon elapse of the time period equivalent to the offset after the encoding of the audio signal is started; and given an instruction to stop the recording, stopping the encoding after ending the encoding of each of record units constituting the video signal and the audio signal. This encoding controlling method according to the invention controls the encoding process in keeping with the offset between the video and the audio signals, thus achieving the seamless connection between chapters.

According to an even further aspect of the invention, there is provided, as claimed in claim 8, an encoding controlling method for use with an encoding controlling apparatus having offset holding means for holding an offset equivalent to a time period by which to start encoding an audio signal earlier than a video signal upon recording of a chapter, the encoding controlling method including the steps of: determining whether a seamless connection is possible between the preceding chapter and the following chapter; if the seamless connection is found possible, then regarding as an initial value of the offset the value of the offset updated in the preceding chapter; if the seamless connection is found impossible, then regarding zero as the initial value of the offset; starting to encode the audio signal; starting to encode the video signal upon elapse of the time period equivalent to the offset after the encoding of the audio signal is started; controlling a volume of the audio signal so as to fade in a first record unit of the audio signal starting from a mute state after the encoding of the audio signal is started; given an instruction to stop the recording, stopping the encoding after ending the encoding of each of record units constituting the video signal and the audio signal; and controlling the volume of the audio signal so as to fade out the last record unit of the audio signal of which the encoding is stopped. This encoding controlling method of the invention controls the encoding process in keeping with the offset between the video and the audio signals, in such a manner as to avert generation of noises at points of seamless connection between chapters.

According to a still further aspect of the invention, there is provided, as claimed in claim 9, a program in an encoding controlling apparatus having offset holding means for holding an offset equivalent to a time period by which to start encoding an audio signal earlier than a video signal upon recording of a chapter, the program causing a computer to carry out the steps of: determining whether a seamless connection is possible between the preceding chapter and the following chapter; if the seamless connection is found possible, then regarding as an initial value of the offset the value of the offset updated in the preceding chapter; if the seamless connection is found impossible, then regarding zero as the initial value of the offset; starting to encode the audio signal; starting to encode the video signal upon elapse of the time period equivalent to the offset after the encoding of the audio signal is started; and given an instruction to stop the recording, stopping the encoding after ending the encoding of each of record units constituting the video signal and the audio signal. This program according to the invention controls the encoding process in keeping with the offset between the video and the audio signals, thereby ensuring the seamless connection between chapters without incurring discrepancies between the video and the audio signals.

According to a yet further aspect of the invention, there is provided, as claimed in claim 10, a program in an encoding controlling apparatus having offset holding means for holding an offset equivalent to a time period by which to start encoding an audio signal earlier than a video signal upon recording of a chapter, the program causing a computer to carry out the steps of: determining whether a seamless connection is possible between the preceding chapter and the following chapter; if the seamless connection is found possible, then regarding as an initial value of the offset the value of the offset updated in the preceding chapter; if the seamless connection is found impossible, then regarding zero as the initial value of the offset; starting to encode the audio signal; starting to encode the video signal upon elapse of the time period equivalent to the offset after the encoding of the audio signal is started; controlling a volume of the audio signal so as to fade in a first record unit of the audio signal starting from a mute state after the encoding of the audio signal is started; given an instruction to stop the recording, stopping the encoding after ending the encoding of each of record units constituting the video signal and the audio signal; and controlling the volume of the audio signal so as to fade out the last record unit of the audio signal of which the encoding is stopped. This program according to the invention controls the encoding process in keeping with the offset between the video and the audio signals, in such a manner as to avert generation of noises at points of seamless connection between chapters.

The inventive arrangements outlined above combine to provide a video encoding apparatus capable of seamlessly connecting chapters without incurring discrepancies between video and audio data being recorded.

BEST MODE FOR CARRYING OUT THE INVENTION

A preferred embodiment of this invention will now be described in detail with reference to the accompanying drawings.

Figure 1:
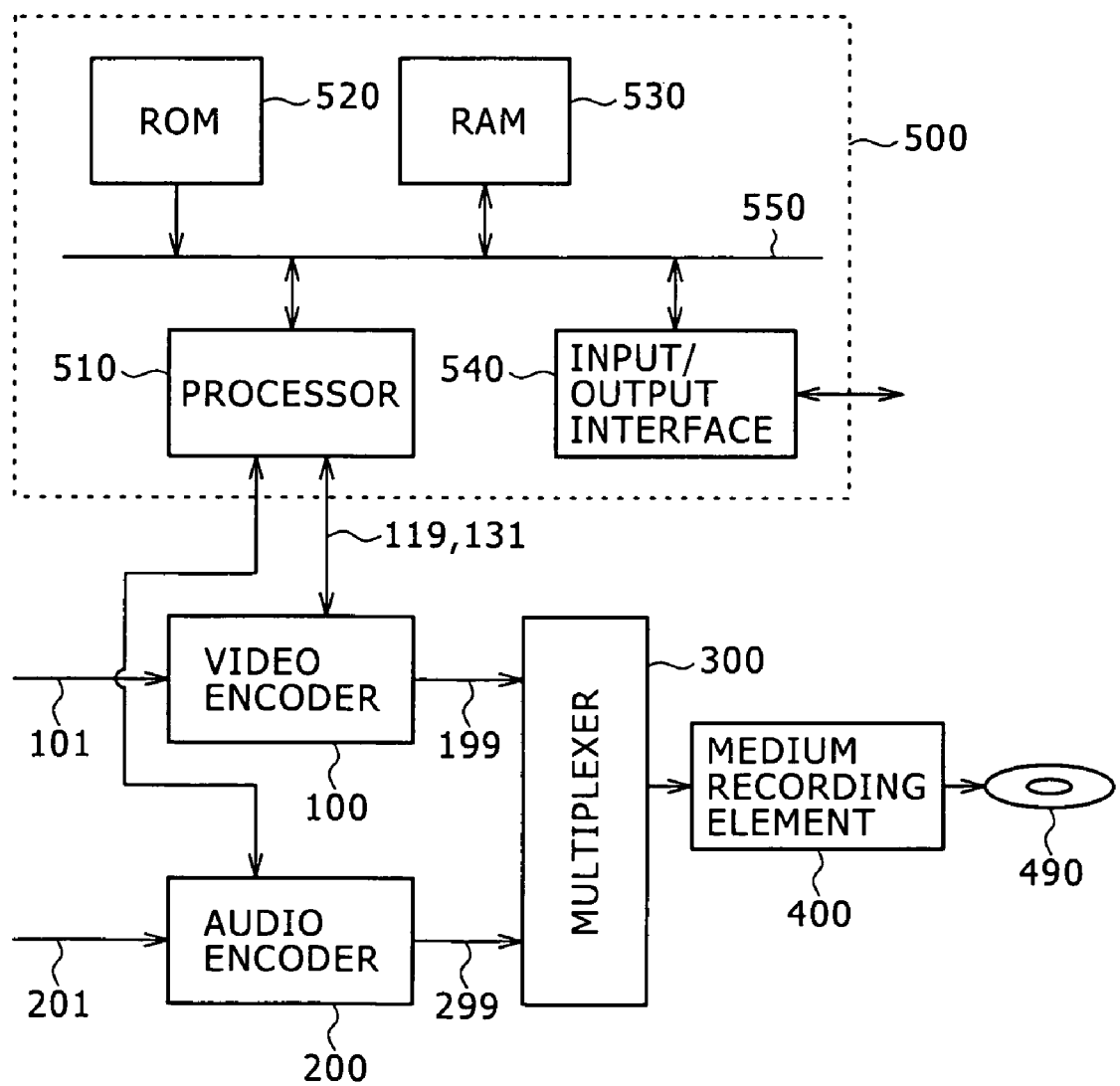
FIG. 1 is a schematic view showing a typical structure of a video encoding apparatus practiced as a preferred embodiment of the invention.

FIG. 1 is a schematic view showing a typical structure of a video encoding apparatus practiced as one preferred embodiment of the invention. The video encoding apparatus includes: a video encoder 100 for encoding a video signal; an audio encoder 200 for encoding an audio signal; a multiplexer 300 for multiplexing what is output by the video encoder 100 and audio encoder 200; a medium recording element 400 for recording to a recording medium 490 stream data multiplexed by the multiplexer 300; and an encoding controlling element 500 for controlling encoding processes performed by the video encoder 100 and audio encoder 200.

The encoding controlling element 500 includes a processor 510, a ROM 520, a RAM 530, an input/output interface 540, and a bus 550 that interconnects these components. The processor 510 controls starts and stops of encoding processes carried out by the video encoder 100 and audio encoder 200 while referencing progress in these processes. The ROM 520 holds programs to be performed by the processor 510 as well as various parameters, and is composed illustratively of an EPROM such as a flash memory. The RAM 530 is a memory that retains work data and other resources needed by the processor 510 during its program execution. Illustratively, the RAM 530 is formed by an SRAM or DRAM. The input/output interface 540 is a device that interfaces data exchanges with the outside. As such, the input/output interface 540 is used illustratively when an instruction is given to start or stop the recording of data to a recording medium 490 or when a program in the ROM 520 is updated.

Figure 2:
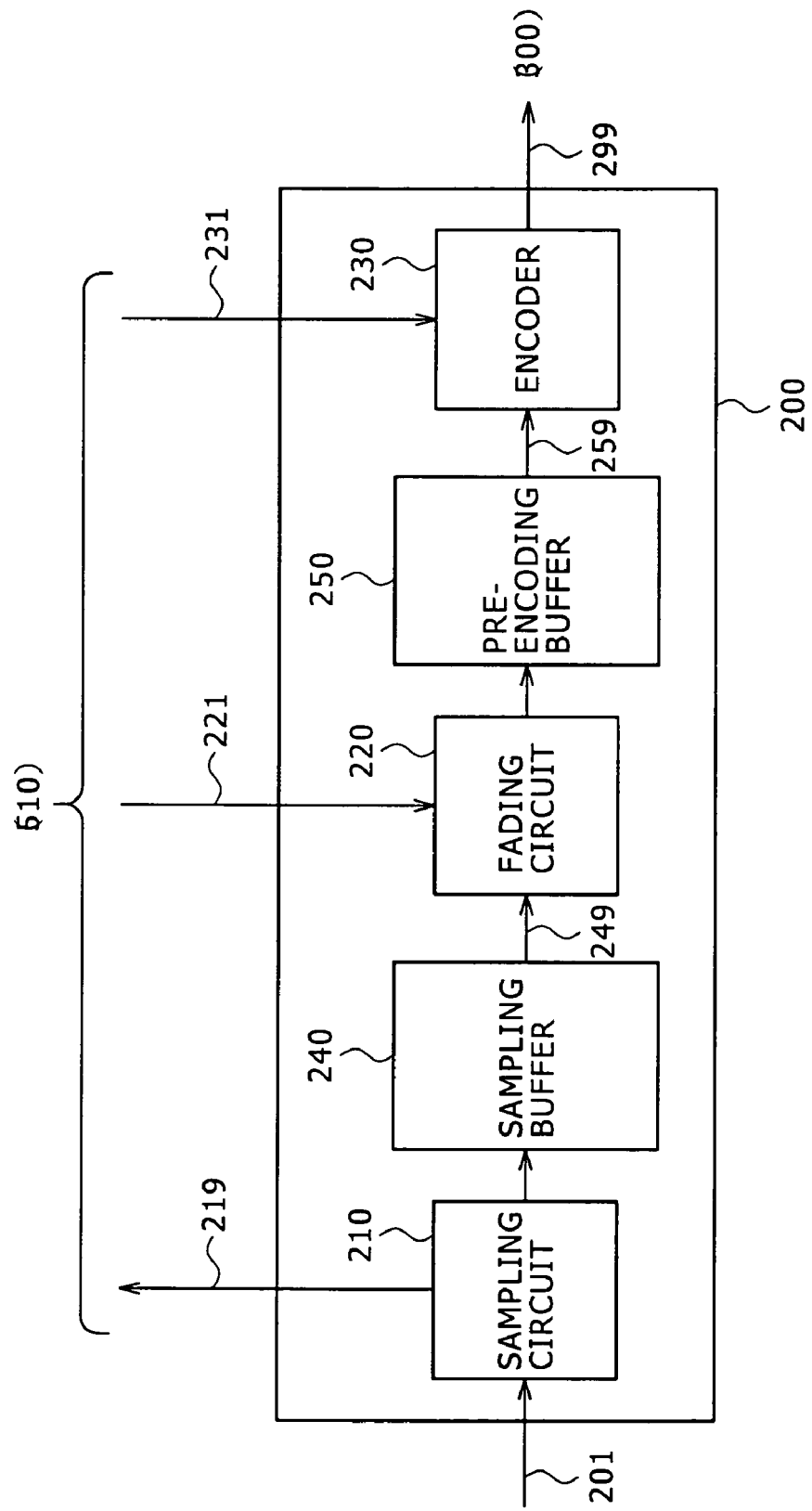
FIG. 2 is a schematic view showing a typical structure of an audio encoder 200 as part of the embodiment.

FIG. 2 is a schematic view showing a typical structure of the audio encoder 200 as part of this embodiment. In the audio encoder 200, a sampling circuit 210, a fading circuit 220, and an encoder 230 are connected on a pipelining basis. A sampling buffer 240 is placed interposingly between the sampling circuit 210 and the fading circuit 200 for timing control purposes, and so is a pre-encoding buffer 250 placed between the fading circuit 220 and the encoder 230.

The sampling circuit 210 samples the audio signal input by way of a signal line 201 and places what is sampled into the sampling buffer 240. The sampling circuit 210 illustratively utilizes 48 kHz as its sampling frequency for AC-3 signals used under the DVD-Video standard. In this setup, when the audio encoder 200 starts or stops the processing of synchronizing frames under the AC-3 scheme shown in FIG. 3, the sampling circuit 210 notifies the encoding controlling element 500 of that start or stop by way of a signal line 219.

The fading circuit 220 controls the volume of the audio signal supplied over a signal line 249. For example, when a chapter is to be recorded, the audio signal volume is controlled in such a manner that the beginning of the chapter is faded in starting from a mute state and that the end of the chapter is faded out. The timing of volume control is specified by the encoding controlling element 500 by way of a signal line 221.

The encoder 230 encodes the audio signal coming over a signal line 259 and outputs what is encoded onto a signal line 299. Whether or not to execute the encoding is controlled by the encoding controlling element 500 by way of a signal line 231.

Figure 3:
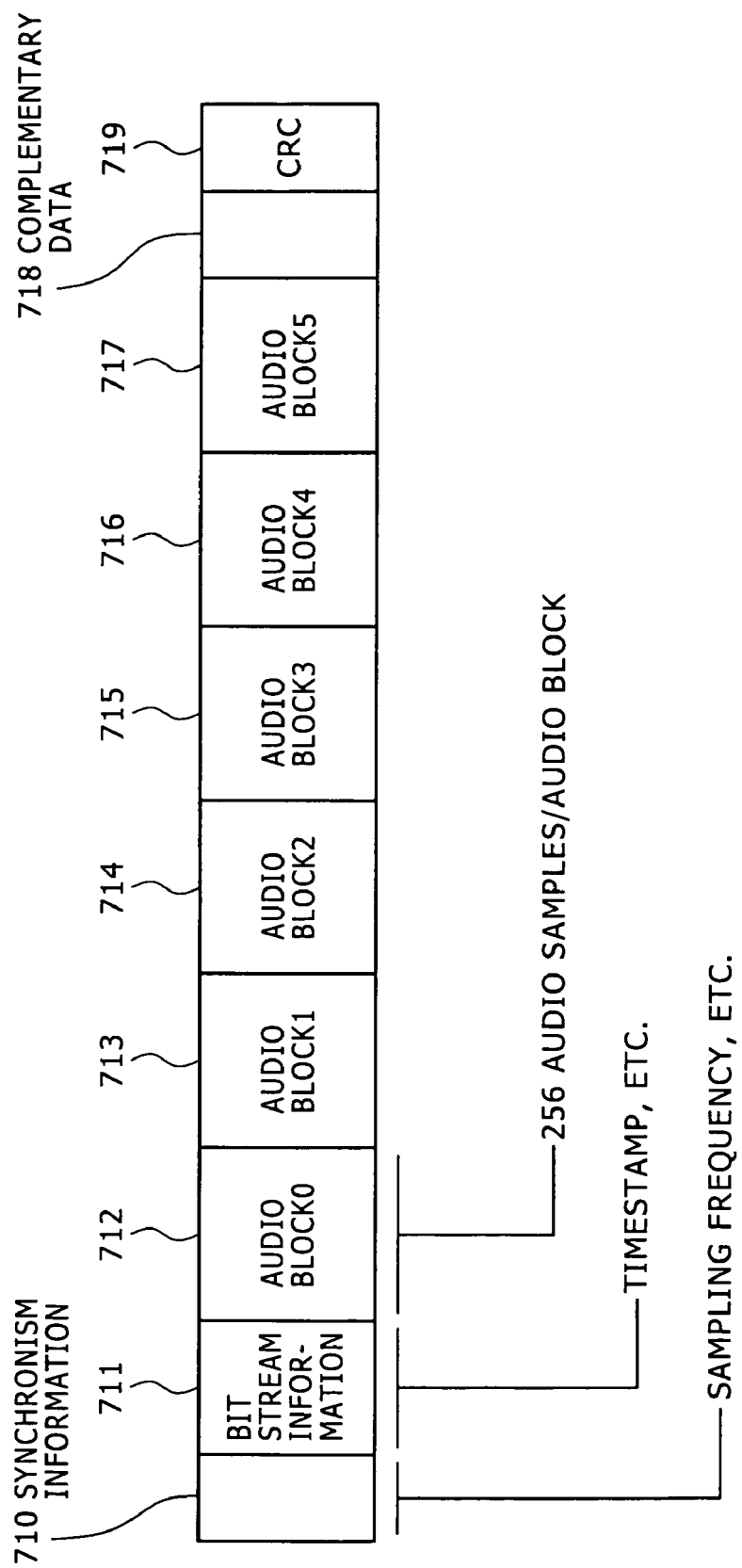
FIG. 3 is a schematic view showing a synchronizing frame structure of an audio signal under the AC-3 scheme.

FIG. 3 is a schematic view showing a synchronizing frame structure of an audio signal under the AC-3 scheme. This synchronizing frame constitutes a processing increment of bit streams according to the AC-3 scheme. As such, the synchronizing frame is called AAU (audio access unit). The synchronizing frame contains synchronism information 710, bit stream information 711, six audio blocks 712 through 717, complementary data 718, and a CRC (cyclic redundancy check) code 719.

The synchronism information 710 is first header information for the synchronizing frame and retains a sampling frequency and other information. The bit stream data 711 is second header information for the synchronizing frame and holds a timestamp and other information.

The audio blocks 712 through 717 each retain 256 audio samples. That means the six audio blocks in a single AAU hold 1,536 audio samples. The 1,536 audio samples are equivalent to 1,536/48=32 ms (milliseconds) of audio data at the sampling frequency of 48 kHz.

The complementary data 718 is used for bit length adjustment. The CRC code 719 is a cyclic redundancy check code by which to detect a burst error in the synchronizing frame.

Figure 4:
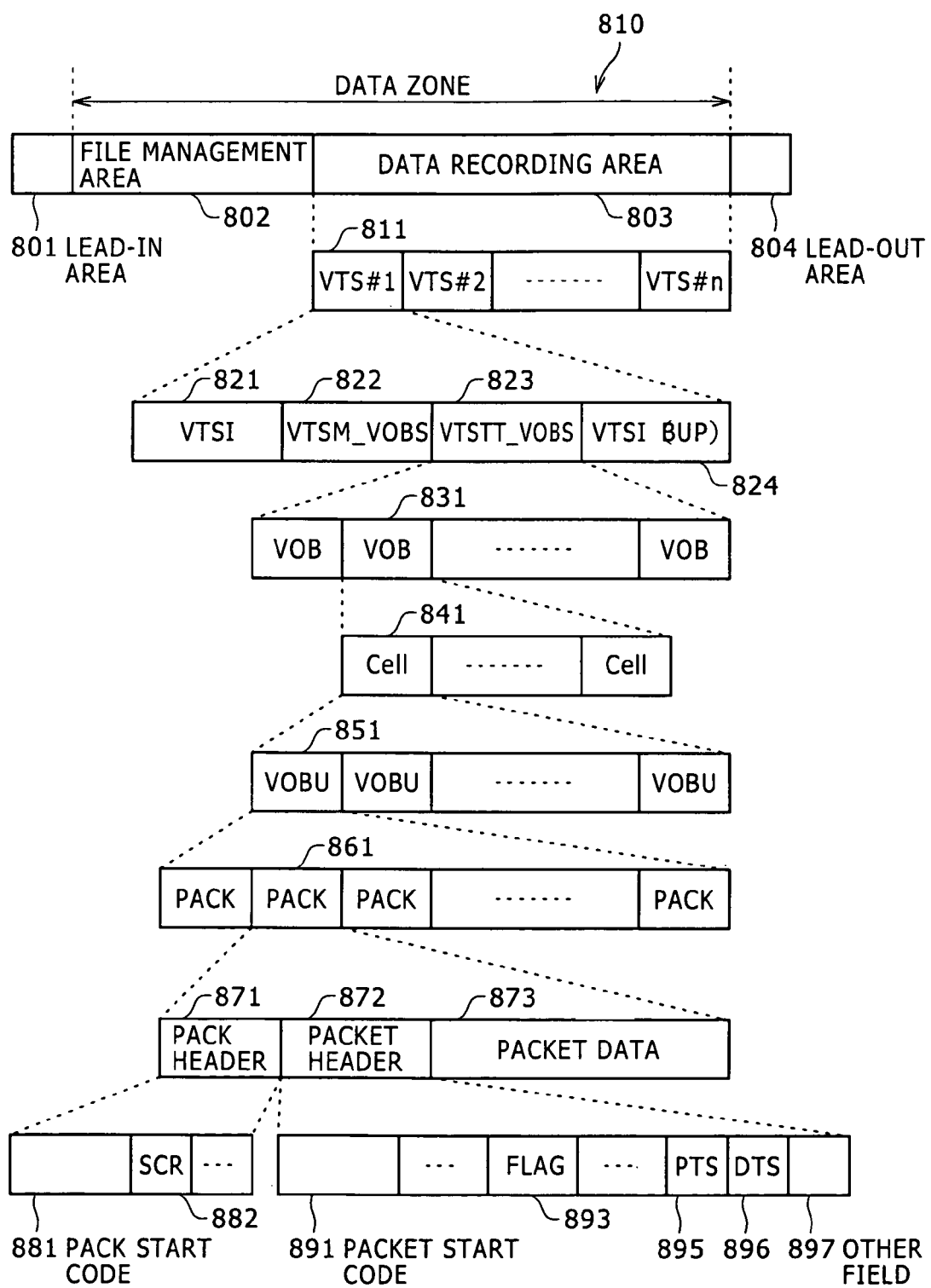
FIG. 4 is a schematic view showing a data structure according to the DVD-Video standard.

FIG. 4 is a schematic view showing a data structure according to the DVD-Video standard. The recording area of the recording medium 490 is divided, in the radially outward direction from the innermost zone of the disk, into a lead-in area 801, a file management area 802, a data recording area 803, and a lead-out area 804.

The file management area 802 contains a UDF (universal disc format) area and a VMG (video manager) area subsequent to the lead-in area 801. The UDF area and VMG area serve as areas in which to record information for managing files of video data and other data recorded on the DVD. The UDF area supports the UDF and ISO 9660 standards so that a computer may read the DVD. The VMG area is an area in which to record DVD management information.

The data recording area 803 is an area in which to record video and audio signals in data units called video title sets (VTS) 811. Each video title set 820 is made up of video title set information (VTSI) 821, a video title set menu (VTSM_VOBS: video object set for the VTSM) 822, a video title set title (VTSTT_VOBS: video object set for titles in a VTS) 823, and a backup (VTSI(BUP): backup of VTSI) 824.

The video title set information (VTSI) 821 serves as control information for the video title set. The video title set menu (VTSM_VOBS) 822 provides a content for diverse menus in the video title set. The video title set title (VTSTT_VOBS) 823 provides a content for title reproduction. The backup (VTSI(BUP)) 824 is a backup copy of the video title set information 821.

The video title set title (VTSTT_VOBS) 823 retains at least one object set called a video object (VOB) 831. Each VOB 831 contains at least one cell 841. Each cell 841 includes at least one video object unit (VOBU) 851. Each VOBU 851 includes a video signal equivalent to one GOP (group of pictures) and a video signal corresponding to that GOP. The video signal is encoded using the MPEG-2 or MPEG-1 standard. The audio signal is encoded using the AC-3, linear PCM, MPEG Audio or like standard.

Each video object unit (VOBU) 851 is formed by a plurality of packs 861. Each pack 861 is made up of at least one packet. In this example, one pack is assumed to contain one packet. More specifically, each pack is formed by a packet prefixed with a pack header 871. Each packet includes a packet header 872 and packet data 873, i.e., a data part. According to the DVD-Video standard, one pack should be made up of 2,048 bytes (equivalent to one sector). Encoded video and audio signals are divided into packs and retained in that form.

The pack header 871 includes a pack start code 881 indicating the beginning of the pack, as well as a system clock reference (SCR) 882. Under the MPEG-2 PS, timestamps are indicated using a frequency of 27 MHz. For that reason, the system clock reference 882 is represented in 42 bits in each pack header 871.

The packet header 872, in keeping with Private 1 Packet, includes a packet start code 891, a flag 893, a PTS field 895, a DTS field 896, and other fields 897. The packet start code 891 indicates the beginning of the packet and includes a stream identifier for identifying the stream in question. The flag 893 contains flags indicative of the presence of the PTS field 895 and DTS field 896. That is, a flag "10" indicates that only the PTS field 895 exists; a flag "11" indicates that both the PTS field 895 and the DTS field 896 exist.

The PTS field 895 and DTS field 896 denote timestamps providing respectively the timing of reproduction output and that of decoding. The decoder circuits refer to the PTS field 895 and DTS field 896 when controlling decoding and reproduction output. The PTS field 895 and DTS field 896 are each represented in 33 bits in the packet header 872. The timestamp in the bit stream information 711 under the AC-3 scheme mentioned above is reflected in the PTS field 895. For the audio signal, the PTS and DTS fields take the same value so that only the PTS field 895 is provided.

Figure 5:
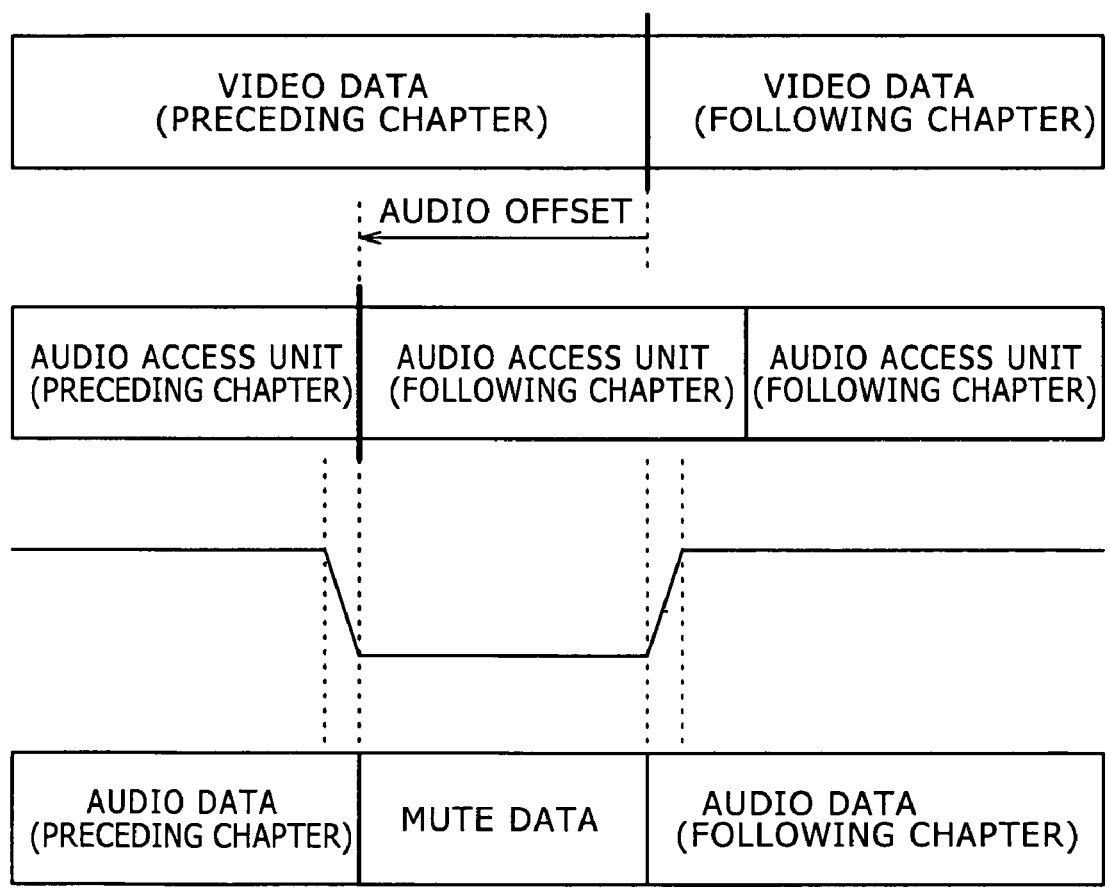
FIG. 5 is a schematic view illustrating the concept of seamless connection provided by the embodiment.

FIG. 5 is a schematic view illustrating the concept of seamless connection provided by this embodiment of the invention. To bring about seamless connection requires that both video data and audio data be continuous between chapters. However, the two kinds of data may not be the same in length and may thus develop discrepancies at points of connection. Illustratively, where the NTSC system is adopted for video data, the frame frequency is 1000/1001×30 (29.97) Hz, so that the period of the data is about 33.367 ms. Meanwhile, if the AC-3 scheme is adopted for audio data, the above-mentioned data unit for processing (AAU) is 32 ms long at the sampling frequency of 48 kHz. That means there could be a discrepancy of up to 32 ms between the video and audio data.

With this embodiment of the invention, a discrepancy between the video and the audio data at a point in time where the preceding chapter was stopped is stored as an audio offset. When recording of the following chapter to be connected seamlessly with the preceding chapter is started, the recording of the audio data is started earlier than that of the video data by a time period equivalent to the audio offset. This arrangement eliminates the discrepancy between the video and the audio data.

Upon end of the audio data in the preceding chapter, the fading circuit 220 controls the volume of the audio data so as to fade out the last audio data unit. Upon start of the following chapter, a mute state is sustained over the time period equivalent to the audio offset, before the fading circuit 220 controls the audio data volume so as to fade in the first audio data unit. The transition time for fade-in and fade-out should preferably be determined in such a manner that viewers will not experience awkwardness. For example, a transmission time of about 1.33 ms may be set with 64 samples at the sampling frequency of 48 kHz. It is also possible immediately to fade in the audio data without passage through a mute state. In this case, the audio output is arranged to begin a little earlier than the video output.

Figure 6:
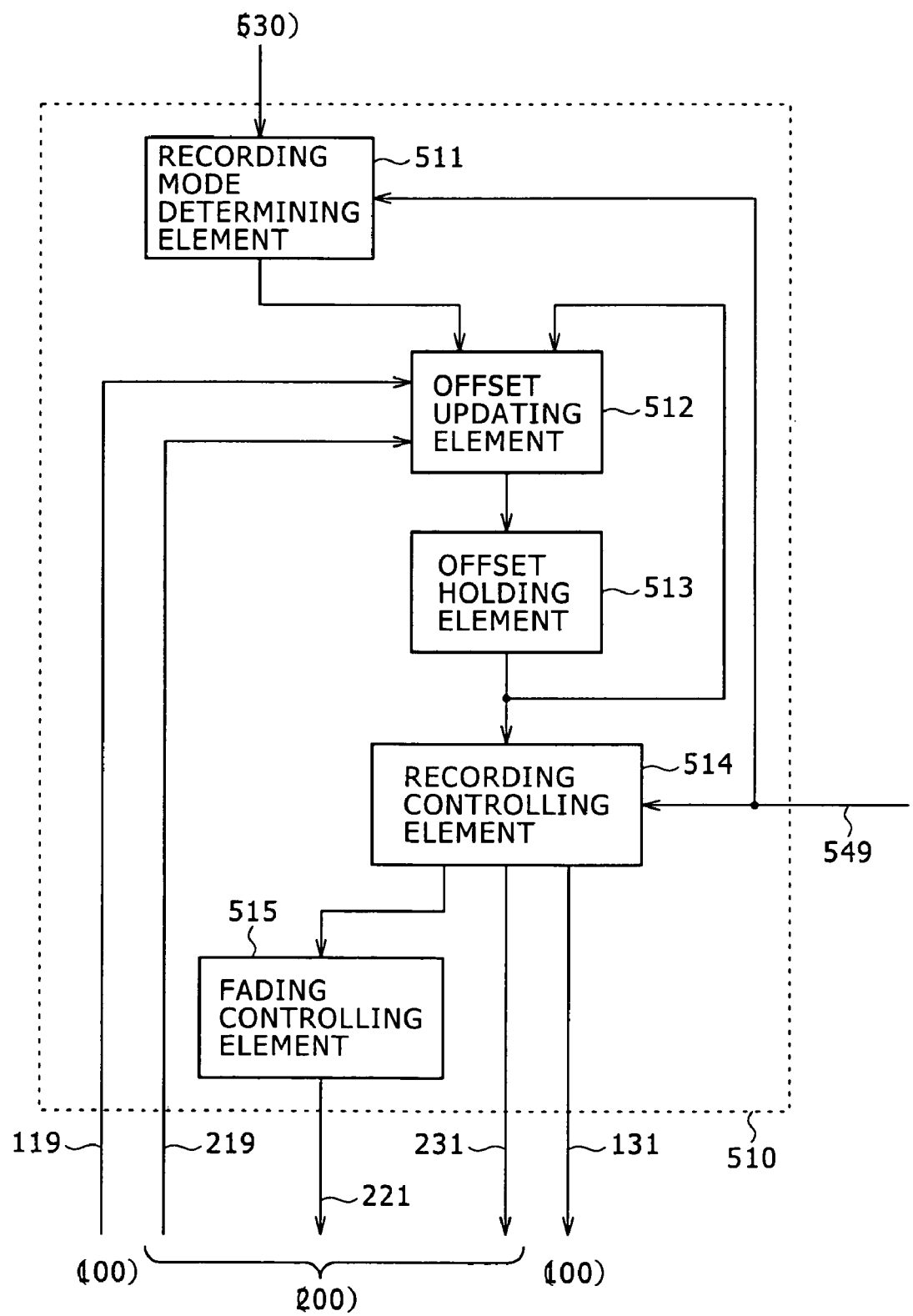
FIG. 6 is a schematic view of a typical functional structure of a processor 510 in an encoding controlling element 500 as part of the embodiment.

FIG. 6 is a schematic view of a typical functional structure of the processor 510 in the encoding controlling element 500 as part of the embodiment. This structure includes a recording mode determining element 511, an offset updating element 512, an offset holding element 513, a recording controlling element 514, and a fading controlling element 515. Whereas these functions are assumed to be implemented by the processor 510 carrying out relevant programs in the ROM 520, these functions may alternatively be implemented using hardware.

The offset holding element 513 holds an audio offset that represents the discrepancy between video and audio data. The offset in the offset holding element 513 is updated by the offset updating element 512. In operation, the offset updating element 512 is instructed by the recording mode determining element 511 to set an initial value to the offset holding element 513. The offset updating element 512 further updates the value in the offset holding element 513 when notified of a start or an end of the processing of a data unit by the video encoder 100 or audio encoder 200.

Illustratively, where the NTSC system is adopted for the video signal, the period of 33.367 ms at the above-mentioned frequency of 29.97 Hz is aligned with a frequency of 90 kHz in the above-described SCR 882 (FIG. 4) as follows:

(1,001/(1,000×30))×90,000=1,001×3=3,003

If the AC-3 scheme is adopted for the audio signal, the period of 32 ms at the above-mentioned frequency of 48 kHz is aligned similarly with the frequency of 90 kHz as follows:

0.032×90,000=2,880

These values are used as data units for processing. More specifically, when notified of each data unit for processing by the video encoder 100 by way of a signal line 119, the offset updating element 512 increments the value in the offset holding element 513 by 3,003; when notified of each data unit for processing by the audio encoder 200 via the signal line 219, the offset updating element 512 decrements the value in the offset holding element 513 by 2,880. As a result, the offset holding element 513 retains the audio offset representative of the discrepancy between the video and the audio data. The notification of each data unit for processing need only be timed in a manner ensuring consistency between the video encoder 100 and the audio encoder 200; each notice may be given either at a start or at an end of the processing of each data unit.

Given an instruction over a signal line 549 to start recording a chapter, the recording mode determining element 511 determines whether seamless connection is possible between chapters. To bring about seamless connection requires meeting several conditions: that the chapter to be connected seamlessly not be the first chapter of the title to which the chapter belongs; that the reproduction time of the last VOB of the preceding chapter not be less than 1.5 seconds; and that a seek time derived from the head position over the medium surface be within a tolerance. The possibility of seamless connection determined by the recording mode determining element 511 is reflected in a seamless playback flag inside C_PBIT (cell playback information table) within PGCI (program chain information) as part of VTSI (video title set information) in the data recording area of DVD. That is, if seamless connection is to be brought about, the seamless playback flag of the following chapter is turned on; if no seamless connection is to be made, the seamless playback flag of the following chapter is turned off.

If seamless connection is found possible, the recording mode determining element 511 sets the preceding audio offset held in the RAM 530 (or ROM 520) as the initial value for the offset holding element 513. If seamless connection is found impossible, then the recording mode determining element 511 sets zero as the initial value for the offset holding element 513.

Given an instruction over the signal line 549 to start recording a chapter, the recording controlling element 514 instructs the video encoder 100 and audio encoder 200 to start their encoding processes by way of signal lines 131 and 231 respectively. At this point, the recording controlling element 514 references the audio offset held in the offset holding element 513 so as to give instructions causing the recording of the audio data to be started earlier than that of the video data by the time period equivalent to the audio offset. Given an instruction over the signal line 549 to stop recording, the recording controlling element 514 instructs the video encoder 100 and audio encoder 200 to stop their encoding processes by way of the signal lines 131 and 231 respectively. At this point, the video encoder 100 and audio encoder 200 are made to stop their encoding only after they have brought the ongoing processes to an end. The recording controlling element 514 further notifies the fading controlling element 515 of the timings of starts and stops of these encoding processes.

When notified of a start and a stop of encoding by the recording controlling element 514, the fading controlling element 515 causes the fading circuit 220 to control the volume of audio data by way of the signal line 221. For example, the audio data volume is controlled in such a manner that when a chapter is recorded, the first audio data unit of the chapter is faded in from a mute state and that at the end of the chapter, the last audio data unit is faded out.

Figure 7:
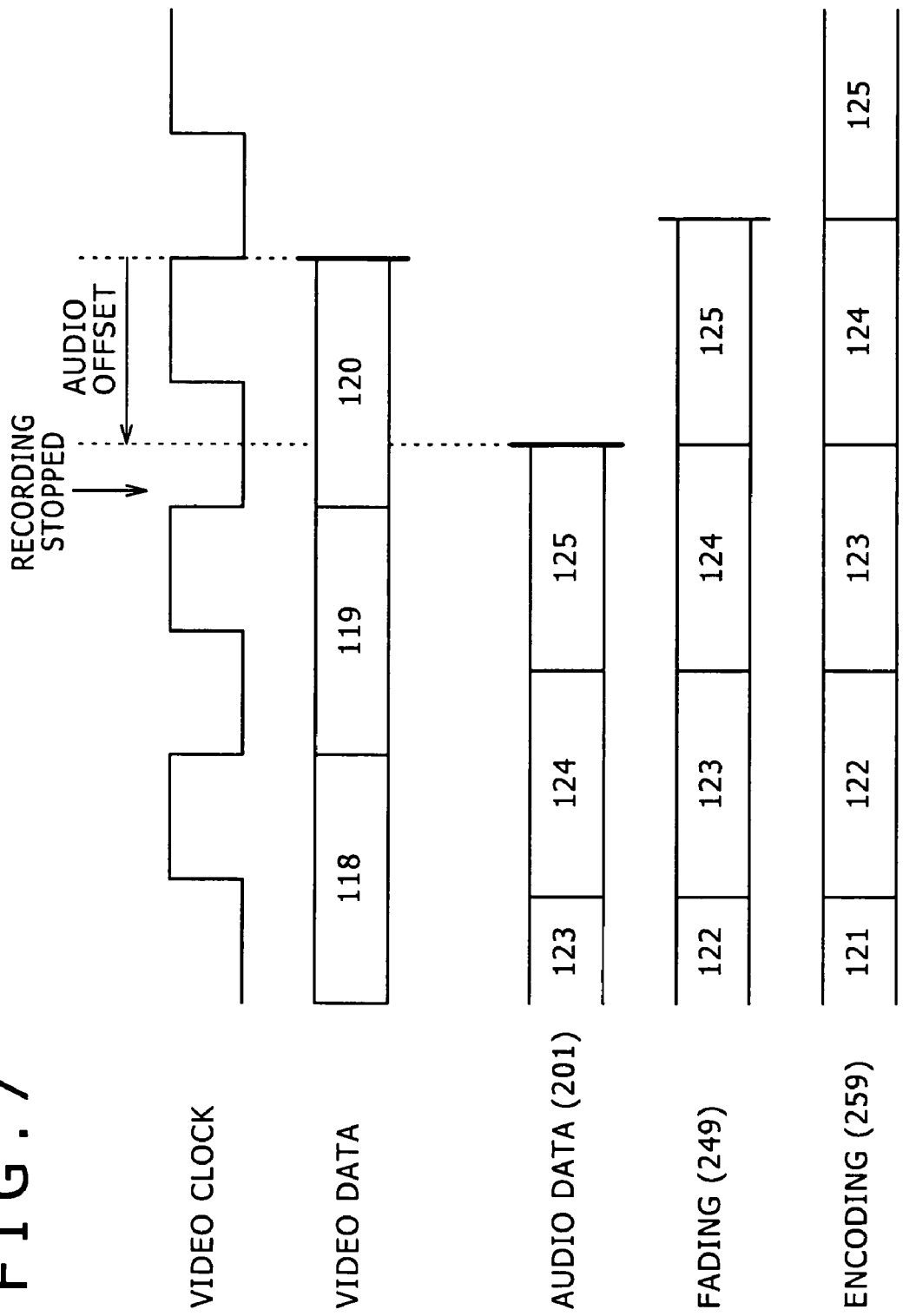
FIG. 7 is a schematic view of a timing chart showing how processes are typically timed by the embodiment.

FIG. 7 is a schematic view of a timing chart showing how processes are typically timed by the embodiment. In the example shown in FIG. 7, an instruction to stop recording is issued halfway through a 120th cycle of video data; the recording of the video is thus stopped at the end of the 120th cycle.

With regard to audio data, an instruction to stop recording is issued halfway through a 125th AAU; the recording of the audio data is thus stopped at the end of the 125th AAU. Meanwhile, if NV stands for the number of video data cycles, NA for the number of audio data AAUs, and OS for the audio offset in effect before the start of recording, then the number of audio data AAUs is defined as follows:

$$NA = INT((NV \times 3{,}003 + OS)/2{,}880)$$

where, INT(x) represents an integer part of "x."

The audio encoder 200 is assumed to operate on a pipelining basis as depicted in FIG. 2. As shown in FIG. 7, after an audio signal is input to the sampling circuit 210 over the signal line 201, sampled audio data is supplied consecutively from the sampling buffer 240 to the fading circuit 220 by way of the signal line 249. In the next cycle, the audio data is forwarded from the pre-encoding buffer 250 to the encoder 230 over the signal line 259.

The workings of the video encoding apparatus according to the invention will now be described with reference to the relevant accompanying drawings.

Figure 8:
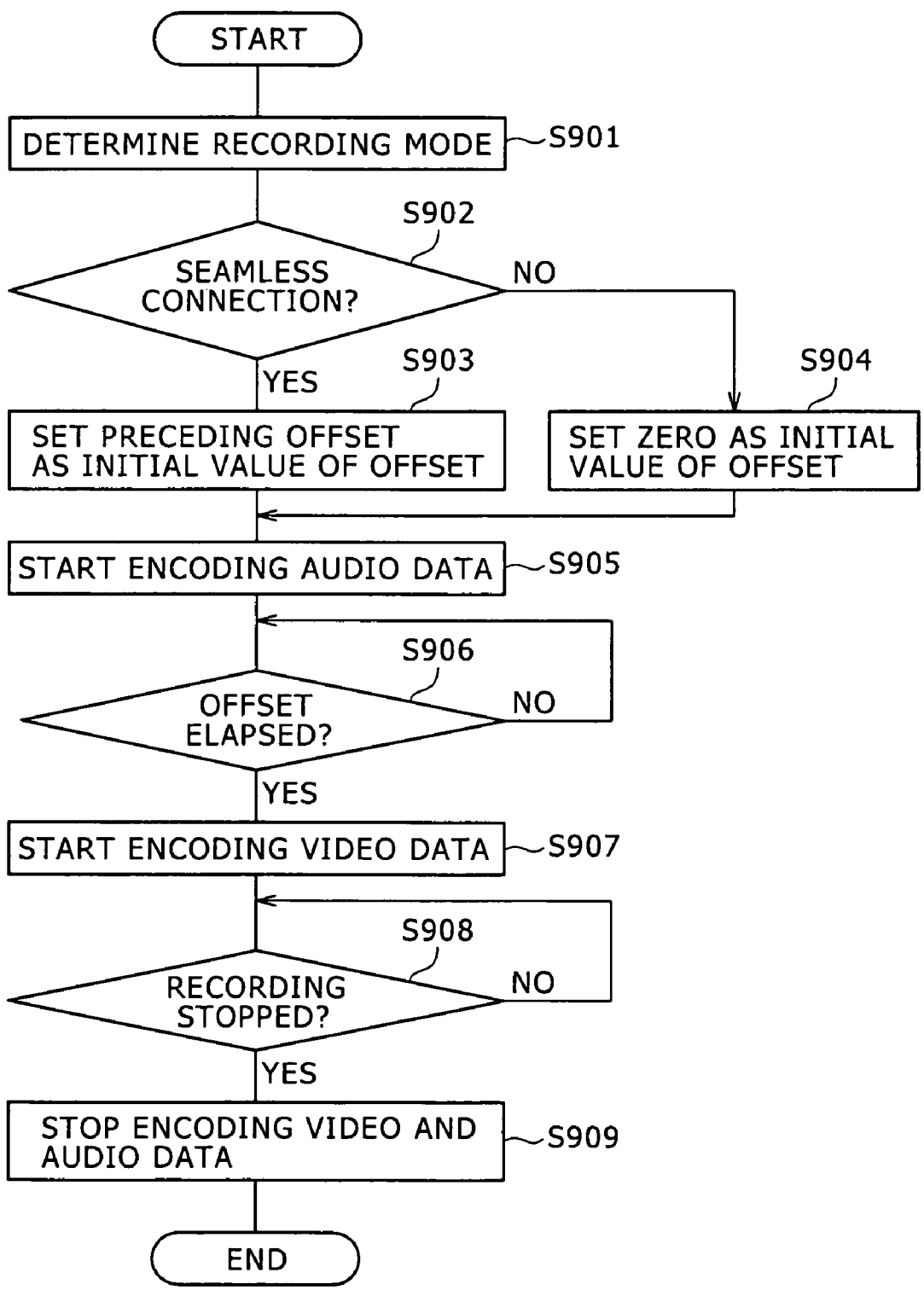
FIG. 8 is a flowchart of steps constituting a typical processing procedure performed by the video encoding apparatus embodying the invention.

FIG. 8 is a flowchart of steps constituting a typical processing procedure performed by the video encoding apparatus embodying the invention. Given an instruction to start recording a chapter by way of the signal line 549, the recording mode determining element 511 determines whether a seamless connection is possible between chapters (in step S901). If a seamless connection is found possible (in step S902), the preceding audio offset held in the RAM 530 (or ROM 520) is set as the initial value for the offset holding element 513 (in step S903). If a seamless connection is not found possible (in step S902), then zero is set as the initial value for the offset holding element 513 (in step S904).

Given an instruction from the recording controlling element 514, the audio encoder 200 starts encoding audio data (in step S905). Upon elapse of a time period equivalent to the audio offset held in the offset holding element 513 (in step S906), the video encoder 100 starts encoding video data in response to another instruction from the recording controlling element 514 (in step S907). These steps allow the encoding of audio data to be started earlier than that of video data by the time period equivalent to the audio offset.

When an instruction is given over the signal line 549 to stop recording the chapter while video and audio data are being recorded (in step S908), the video encoder 100 and audio encoder 200 stop their encoding processes under control of the recording controlling element 514, whereby recording of the data is stopped (in step S909). If the processing of any data units is still in progress, the recording is stopped only after the processing of each of the data units is brought to an end.

Figure 9:
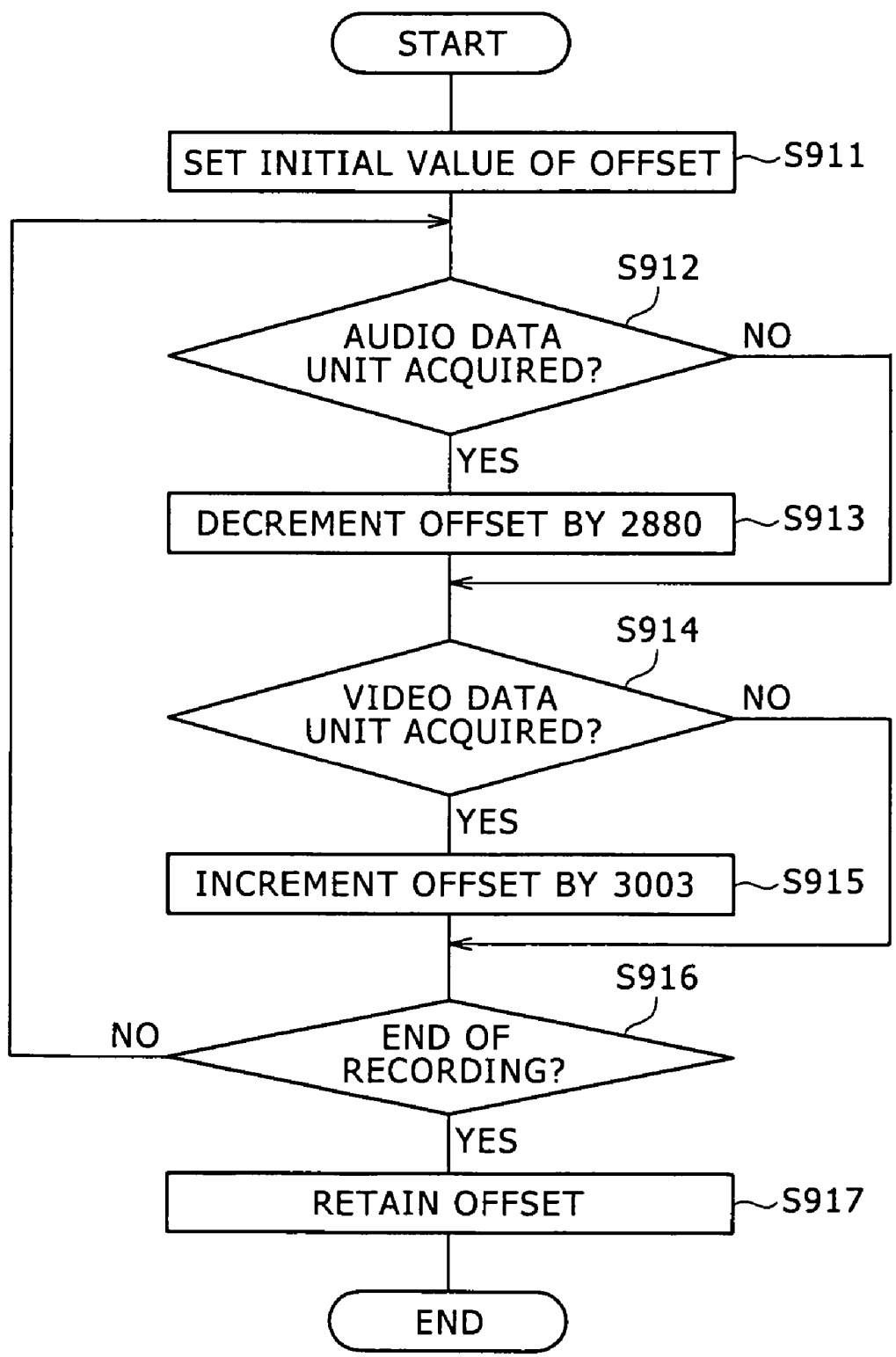
FIG. 9 is a flowchart of steps constituting an audio offset updating procedure performed by the embodiment.

FIG. 9 is a flowchart of steps constituting an audio offset updating procedure performed by the embodiment. Given an instruction to start recording a chapter, an initial value of offset is set to the offset holding element 513 as described in steps S901 through S904 of FIG. 8 (in step S911).

With the encoding of audio data started in step S905 of FIG. 8, every time the processing of AAU (i.e., an audio data unit for processing) is started or stopped (in step S912), the value in the offset holding element 513 is decremented (by 2,880 in the above example, in step S913). With the encoding of video data started in step S907 of FIG. 8, every time the processing of a cycle (i.e., video data unit for processing) is started or stopped (in step S914), the value in the offset holding element 513 is incremented (by 3,003 in the above example, in step S915). The above steps are repeated until the recording is brought to an end (in step S916).

When the encoding of video and audio data is stopped in step S909 of FIG. 8, the audio offset value being held in the offset holding element 513 is brought into the RAM 530 (or ROM 520) for storage (in step S917). This makes it possible to reference the preceding audio offset value when the following chapter is to be recorded.

Figure 10:
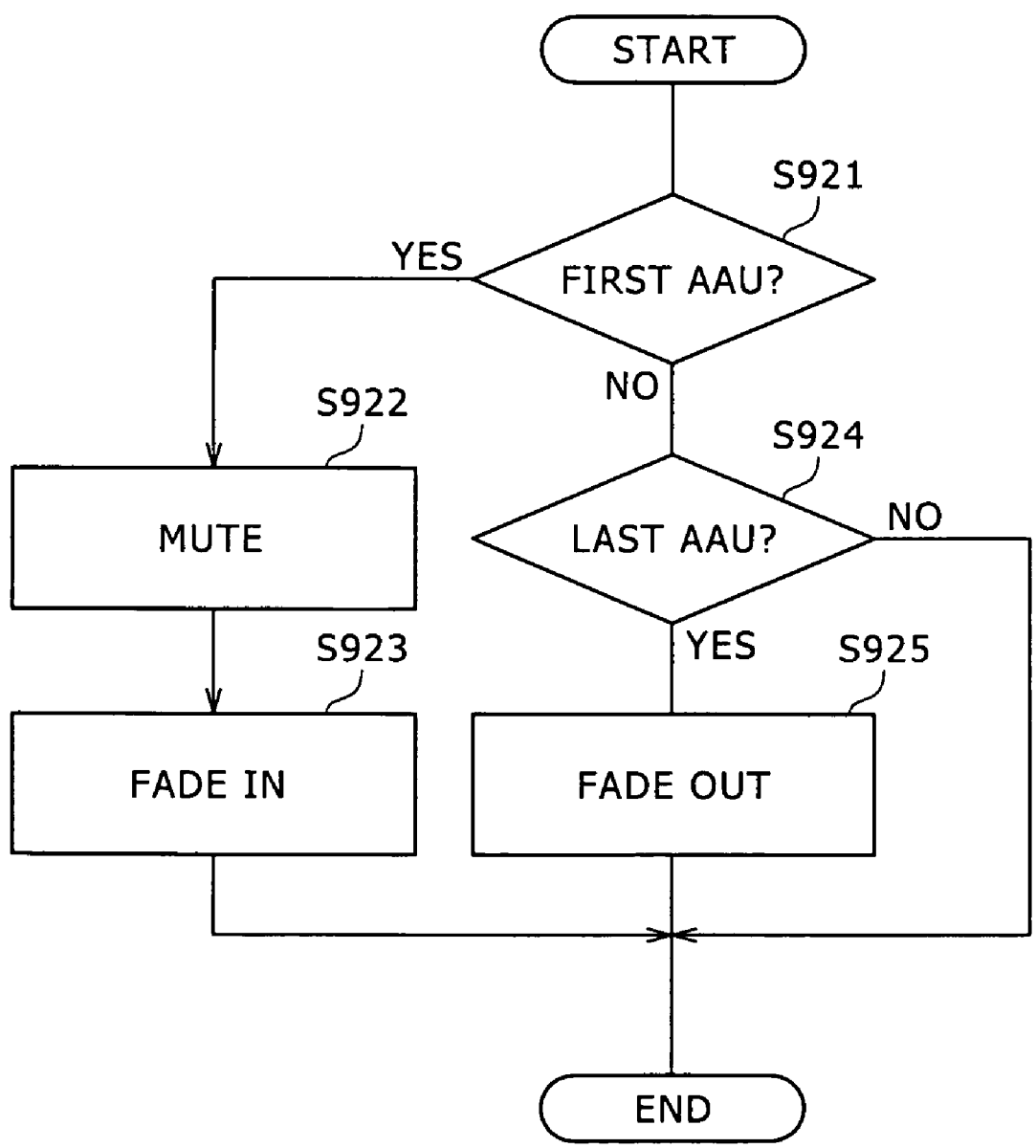
FIG. 10 is a flowchart of steps constituting an audio data volume controlling procedure executed by the embodiment.

FIG. 10 is a flowchart of steps constituting an audio data volume controlling procedure executed by the embodiment. When the first AAU of a given chapter is detected (in step S921), the fading controlling element 515 begins with a mute state (in step S922) and proceeds to fade in audio data (in step S923). Alternatively, the fade-in process of step S923 may be carried out immediately, i.e., without passing through the mute state of step S922.

When the last AAU of a given chapter is detected (in step S924), the fading controlling element 515 fades out audio data at the end of the last AAU (in step S925). This makes it possible to connect the mute states making up a seamless connection between the chapters, whereby generation of undesired noises is averted.

According to the preferred embodiment of the invention, as described above, when chapters are to be connected seamlessly, the recording controlling element 514 gives instructions causing the recording of audio data to be started earlier than that of video data by the time period equivalent to the audio offset which is found upon reference to the offset holding element 513. This makes it possible to ensure seamless connection between the chapters without incurring discrepancies between video and audio data.

Although the above embodiment was shown adopting the NTSC system for video reproduction, this is not limitative of the invention. The PAL system with the frame frequency of 25 Hz can also be used just as effectively. Since the period of the PAL system is 40 ms, if 90 kHz is taken as the unit, then 40 ms×90 kHz=3600. Thus the above-mentioned value "3,003" is to be replaced by a value "3,600" when this invention is practiced in conjunction with the PAL system.

Although the AC-3 scheme was shown adopted for audio data encoding in conjunction with the above-described embodiment, this is not limitative of the invention. Alternatively, the MPEG Audio scheme may be adopted just as effectively. Under the MPEG Audio scheme, the reproduction time per AAU is 24 ms when the bit rate is 384 kbps, the sampling frequency is 48 kHz, and the compression mode is Layer 2. If 90 kHz is taken as the unit, then 24 ms×90 kHz=2,160. Thus the above-mentioned value "2,880" is to be replaced by a value "2,160" when this invention is practiced in conjunction with the MPEG Audio scheme.

While a preferred embodiment of this invention has been described using specific terms, such description is for illustrative purposes only, and it is to be understood that although some of the specificities contained in the description may correspond to the ensuing claims as outlined below, they are provided only for illustrative purposes. It is also to be understood that changes and variations may be made without departing from the spirit or scope of the claims that follow.

For example, in claim 1, the offset holding means may correspond illustratively to the offset holding element 513, the recording mode determining means to the recording mode determining element 511, the offset updating means to the offset updating element 512, and the recording controlling means to the recording controlling element 514.

In claim 4, the fading controlling means may correspond illustratively to the fading controlling element 515.

In claim 6, the video encoding means may correspond illustratively to the video encoder 100, the audio encoding means to the audio encoder 200, the offset holding means to the offset holding element 513, the recording mode determining means to the recording mode determining element 511, the offset updating means to the offset updating element 512, the recording controlling means to the recording controlling element 514, and the multiplexing means to the multiplexer 300.

In claims 7 and 9, the offset holding means may correspond illustratively to the offset holding element 513, and the encoding controlling apparatus to the encoding controlling element 500. Also in claims 7 and 9, the step of determining whether a seamless connection is possible between the preceding chapter and the following chapter may correspond illustratively to step S901; the steps of, if the seamless connection is found possible, then regarding as an initial value of the offset the value of the offset updated in the chapter, and if the seamless connection is found impossible, then regarding zero as the initial value of the offset, may correspond illustratively to steps S902 through S904; the step of starting to encode the audio signal may correspond illustratively to step S905; the step of starting to encode the video signal upon elapse of the time period equivalent to the offset after the encoding of the audio signal is started may correspond illustratively to steps S906 and S907; and the step of, given an instruction to stop the recording, stopping the encoding after ending the encoding of each of record units constituting the video signal and the audio signal, may correspond illustratively to step S908 and S909.

In claims 8 and 10, the offset holding means may correspond illustratively to the offset holding element 513, and the encoding controlling apparatus to the encoding controlling element 500. Also in claims 8 and 10, the step of determining whether a seamless connection is possible between the preceding chapter and the following chapter may correspond illustratively to step S901; the steps of, if the seamless connection is found possible, then regarding as an initial value of the offset the value of the offset updated in the preceding chapter, and if the seamless connection is found impossible, then regarding zero as the initial value of the offset, may correspond illustratively to steps S902 through S904; the step of starting to encode the audio signal may correspond illustratively to step S905; the step of controlling a volume of the audio signal so as to fade in a first record unit of the audio signal starting from a mute state after the encoding of the audio signal is started may correspond illustratively to steps S921 through S923; the step of starting to encode the video signal upon elapse of the time period equivalent to the offset after the encoding of the audio signal is started may correspond illustratively to steps S906 and S907; the step of, given an instruction to stop the recording, stopping the encoding after ending the encoding of each of record units constituting the video signal and the audio signal, may correspond illustratively to steps S908 and S909; and the step of controlling the volume of the audio signal so as to fade out the last record unit of the audio signal of which the encoding is stopped may correspond illustratively to steps S924 and S925.

The series of steps discussed above in conjunction with the above-described embodiment of the invention may be regarded as a method including these steps, as a program for causing a computer to carry out the steps, or as a recording medium which stores the program for causing the computer to execute the steps.

INDUSTRIAL APPLICABILITY

In a typical application, the invention may be implemented to encode video signals into MPEG-2 format and audio signals into AC-3 format before writing the encoded signals to DVDs.

The invention claimed is:

1. An encoding controlling apparatus comprising:
offset holding means for holding an offset equivalent to a time period by which to start encoding an audio signal earlier than a video signal upon recording of a chapter;
recording mode determining means for determining whether a seamless connection is possible between the preceding chapter and the following chapter in order to set an initial value of said offset depending on an outcome of the determination;
offset updating means for updating said offset in keeping with progress in encoding said video signal and said audio signal; and
recording controlling means for giving an instruction either to start or to stop the encoding of said video signal and said audio signal in accordance with said offset.

2. An encoding controlling apparatus according to claim 1, wherein, upon start of the recording, said recording controlling means starts encoding said audio signal earlier than said video signal by said time period equivalent to said offset; and upon end of the recording, said recording controlling means stops the encoding after ending the encoding of each of record units constituting said video signal and said audio signal.

3. An encoding controlling apparatus according to claim 1, wherein, if said seamless connection is found possible, then said recording mode determining means regards as the initial value of said offset the value of said offset updated in said preceding chapter; and if said seamless connection is found impossible, then said recording mode determining means regards zero as the initial value of said offset.

4. An encoding controlling apparatus according to claim 1, further comprising fading controlling means for controlling a volume of said audio signal in accordance with an instruction either to start or to stop said audio signal.

5. An encoding controlling apparatus according to claim 4, wherein said fading controlling means controls the volume of said audio signal so as to fade in said audio signal starting from a mute state upon start of the recording, and to fade out said audio signal upon end of the recording.

6. An encoding system comprising:
video encoding means for encoding a video signal;
audio encoding means for encoding an audio signal;
offset holding means for holding an offset equivalent to a time period by which to start encoding said audio signal earlier than said video signal upon recording of a chapter;
recording mode determining means for determining whether a seamless connection is possible between the preceding chapter and the following chapter in order to set an initial value of said offset depending on an outcome of the determination;
offset updating means for updating said offset in keeping with progress in the encoding of said video signal and said audio signal performed by said video encoding means and said audio encoding means respectively;
recording controlling means for giving an instruction either to start or to stop the encoding of said video signal and said audio signal in accordance with said offset; and
multiplexing means for multiplexing the encoded video signal and the encoded audio signal output by said video encoding means and said audio encoding means respectively.

7. An encoding controlling method for use with an encoding controlling apparatus having offset holding means for holding an offset equivalent to a time period by which to start encoding an audio signal earlier than a video signal upon recording of a chapter, said encoding controlling method comprising the steps of:
determining whether a seamless connection is possible between the preceding chapter and the following chapter;
if said seamless connection is found possible, then regarding as an initial value of said offset the value of said offset updated in said preceding chapter;
if said seamless connection is found impossible, then regarding zero as the initial value of said offset;
starting to encode said audio signal;
starting to encode said video signal upon elapse of said time period equivalent to said offset after the encoding of said audio signal is started; and
given an instruction to stop the recording, stopping the encoding after ending the encoding of each of record units constituting said video signal and said audio signal.

8. An encoding controlling method for use with an encoding controlling apparatus having offset holding means for holding an offset equivalent to a time period by which to start encoding an audio signal earlier than a video signal upon recording of a chapter, said encoding controlling method comprising the steps of:
determining whether a seamless connection is possible between the preceding chapter and the following chapter;
if said seamless connection is found possible, then regarding as an initial value of said offset the value of said offset updated in said preceding chapter;
if said seamless connection is found impossible, then regarding zero as the initial value of said offset;
starting to encode said audio signal;
starting to encode said video signal upon elapse of said time period equivalent to said offset after the encoding of said audio signal is started;
controlling a volume of said audio signal so as to fade in a first record unit of said audio signal starting from a mute state after the encoding of said audio signal is started;
given an instruction to stop the recording, stopping the encoding after ending the encoding of each of record units constituting said video signal and said audio signal; and
controlling the volume of said audio signal so as to fade out the last record unit of said audio signal of which the encoding is stopped.

9. A computer program product in an encoding controlling apparatus having offset holding means for holding an offset equivalent to a time period by which to start encoding an audio signal earlier than a video signal upon recording of a chapter, said computer program product stored on a computer readable medium and including program code for performing the steps of:
determining whether a seamless connection is possible between the preceding chapter and the following chapter;
if said seamless connection is found possible, then regarding as an initial value of said offset the value of said offset updated in said preceding chapter;
if said seamless connection is found impossible, then regarding zero as the initial value of said offset;
starting to encode said audio signal;
starting to encode said video signal upon elapse of said time period equivalent to said offset after the encoding of said audio signal is started; and given an instruction to stop the recording, stopping the encoding after ending the encoding of each of record units constituting said video signal and said audio signal.

10. A computer program product in an encoding controlling apparatus having offset holding means for holding an offset equivalent to a time period by which to start encoding an audio signal earlier than a video signal upon recording of a chapter, said computer program product stored on a computer readable medium and including program code for performing the steps of:

determining whether a seamless connection is possible between the preceding chapter and the following chapter;

if said seamless connection is found possible, then regarding as an initial value of said offset the value of said offset updated in said preceding chapter;

if said seamless connection is found impossible, then regarding zero as the initial value of said offset;

starting to encode said audio signal;

starting to encode said video signal upon elapse of said time period equivalent to said offset after the encoding of said audio signal is started;

controlling a volume of said audio signal so as to fade in a first record unit of said audio signal starting from a mute state after the encoding of said audio signal is started;

given an instruction to stop the recording, stopping the encoding after ending the encoding of each of record units constituting said video signal and said audio signal; and controlling the volume of said audio signal so as to fade out the last record unit of said audio signal of which the encoding is stopped.

* * * * *